(12) United States Patent
Mudd et al.

(10) Patent No.: US 8,348,517 B2
(45) Date of Patent: Jan. 8, 2013

(54) SHUTTER FOR A FIBER OPTIC COMPONENT AND A FIBER OPTIC COMPONENT INCLUDING THE SHUTTER

(75) Inventors: Ronald Mudd, Richardson, TX (US); Joseph Livingston, Frisco, TX (US); Brad Billman, Denton, TX (US); Thomas Crain, Melissa, TX (US); Aly Fahd, Dallas, TX (US); Gary Gibbs, Wylie, TX (US); Jeffrey Dale Nielson, Wylie, TX (US); Gil Ruiz, McKinney, TX (US); Wade James Womack, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 375 days.

(21) Appl. No.: 12/706,071

(22) Filed: Feb. 16, 2010

(65) Prior Publication Data

US 2011/0038581 A1    Feb. 17, 2011

Related U.S. Application Data

(60) Provisional application No. 61/233,544, filed on Aug. 13, 2009.

(51) Int. Cl.
*G02B 6/36* (2006.01)

(52) U.S. Cl. .............. 385/53; 385/55; 385/88; 385/92
(58) Field of Classification Search .................. None
See application file for complete search history.

(56) References Cited

U.S. PATENT DOCUMENTS

| | | | |
|---|---|---|---|
| 4,006,868 A * | 2/1977 | Hochradel et al. | 406/186 |
| 4,738,506 A | 4/1988 | Abendschein | |
| 6,079,881 A | 6/2000 | Roth | |
| 6,425,694 B1 * | 7/2002 | Szilagyi et al. | 385/76 |
| 6,460,726 B1 | 10/2002 | Hierzer | |
| 6,612,750 B1 * | 9/2003 | Bull et al. | 385/65 |
| 6,789,950 B1 * | 9/2004 | Loder et al. | 385/53 |
| 6,848,833 B1 * | 2/2005 | Kamarauskas et al. | 385/55 |

* cited by examiner

*Primary Examiner* — Uyen Chau N Le
*Assistant Examiner* — Chad Smith
(74) *Attorney, Agent, or Firm* — Muncy, Geissler, Olds & Lowe, PLLC

(57) ABSTRACT

A fiber optic component includes a body having at least one receptacle configured to receive a fiber optic connector, a shutter base mounted to the body at a mounting location adjacent to the at least one receptacle, and a first shutter connected to the shutter base by a first hinge. The first shutter, first hinge and shutter base are unitarily formed, and the first shutter is shiftable from a first position biased against the body and covering the at least one receptacle to a second position biased to an angularly spaced position relative to the first position.

11 Claims, 3 Drawing Sheets

SHUTTER FOR A FIBER OPTIC COMPONENT AND A FIBER OPTIC COMPONENT INCLUDING THE SHUTTER

CROSS-REFERENCE TO RELATED APPLICATIONS

The present application claims the benefit of U.S. Provisional Patent Application No. 61/233,544, filed Aug. 13, 2009, the entire contents of which is hereby incorporated by reference.

FIELD OF THE INVENTION

The present invention is directed to a shutter for selectively covering a receptacle of a fiber optic component and toward a fiber optic component including such a shutter, and, more specifically, toward a two-position shutter device for selectively covering one or more receptacles of a fiber optic component and toward a fiber optic component including such a shutter device.

BACKGROUND OF THE INVENTION

One type of fiber optic organization component, such as a fiber tray, shelf, rack or panel, receives a trunk cable made up of a plurality of optical fibers. These fibers are fanned out at the organization component and individually connected to a plurality of female receptacles. Male connectors can be plugged into the receptacles to form a connection between a fiber optic cable attached to the male connector and one of the fibers of the trunk cable. When a male connector is plugged into a given receptacle, the close fit between the connector and the receptacle helps prevent dust from entering the receptacle. When a given receptacle is not in use, it may be desirable to cover the empty receptacle in some manner to keep out dust which can later interfere with the proper functioning of the receptacle, and to also prevent laser light from exiting the empty receptacle, which can damage a person's eyesight. Fiber optic components other than organization components (such passive or active devices, like amplifiers, splitters, attenuators, and multiplexers) may also include one or more receptacles for receiving male connectors and may also benefit from a shutter mechanism for reducing the amount of dust entering an empty receptacle and light exiting an empty receptacle.

Dust can be kept out of a fiber optic receptacle in various ways. One approach is the use of removable plugs shaped like the ends of the male connectors that can be inserted in the receptacles. Such plugs, while effective, may be dropped and lost when being inserted or removed and may not be readily available when needed. Spring-loaded covers and covers having living hinges are also known for covering unused receptacles. Such covers are securely connected to the fiber optic adapter and will not be lost when a given receptacle is uncovered. However, such shutters generally include a spring for biasing the cover toward a closed position and/or a latch for securing the cover in a closed position which makes these covers relatively complex and expensive to manufacture. Moreover, connectors having covers biased toward a closed position by a spring must be held open against the force of the spring when an operator attempts to load the receptacle with a connector, which can be cumbersome during connector installations. Latches require unlatching to allow a cover to open and must often be deliberately pressed closed to ensure that they are latched in a position that will keep out dust.

It would therefore be desirable to provide a closure for a fiber optic receptacle in a fiber optic component that is relatively inexpensive to manufacture that that does not suffer from the aforementioned shortcomings.

SUMMARY OF THE INVENTION

These problems and others are addressed by embodiments of the present invention, a first aspect of which comprises a fiber optic component having a body including a receptacle configured to receive a fiber optic connector, a shutter base mounted to the body at a mounting location adjacent to the receptacle, and a first shutter connected to the shutter base by a first hinge. The first shutter, first hinge and shutter base are formed as a unitary member, and the first shutter is shiftable from a first position biased against the body and covering the receptacle to a second position angularly spaced from the first position.

Another aspect of the invention comprises a shutter component mountable to a mounting location of a fiber optic component adjacent to at least one receptacle on the fiber optic component which shutter component selectively covers the at least one receptacle on the fiber optic component. The shutter component includes a shutter base mountable to the mounting location of the fiber optic component and the shutter base has a central plane. A first shutter is connected to the shutter base by a first hinge, and a second shutter is connected to the shutter base by a second hinge. The first shutter, the first hinge, the second shutter, the second hinge and the shutter base are formed as a unitary member, and the first shutter is shiftable from a first position biased toward and overlying the central plane and making an acute angle with the central plane to a second position projecting away from the central plane and making an obtuse angle with the central plane. The second shutter is also shiftable from a first position biased toward and overlying the central plane and making an acute angle with the central plane and a second position projecting away from the central plane and making an obtuse angle with the central plane.

A further aspect of the invention comprises a fiber optic component that includes a body having at least one receptacle configured to receive a fiber optic connector and a base mounted to the body at a mounting location adjacent to the at least one receptacle. The component also includes a shutter mechanism for selectively allowing access to the at least one receptacle and a hinge mechanism for connecting the shutter mechanism to the base and for positively holding the shutter mechanism in one of first and second positions relative to the base. The base, shutter mechanism and hinge mechanism are formed as a unitary member, and the shutter mechanism is shiftable from a first position covering the at least one receptacle to a second position angularly spaced from the first position.

BRIEF DESCRIPTION OF THE DRAWINGS

These and other aspects of embodiments of the present invention will be better understood after a reading of the following description together with the attached drawings.

DETAILED DESCRIPTION

Figure 1:
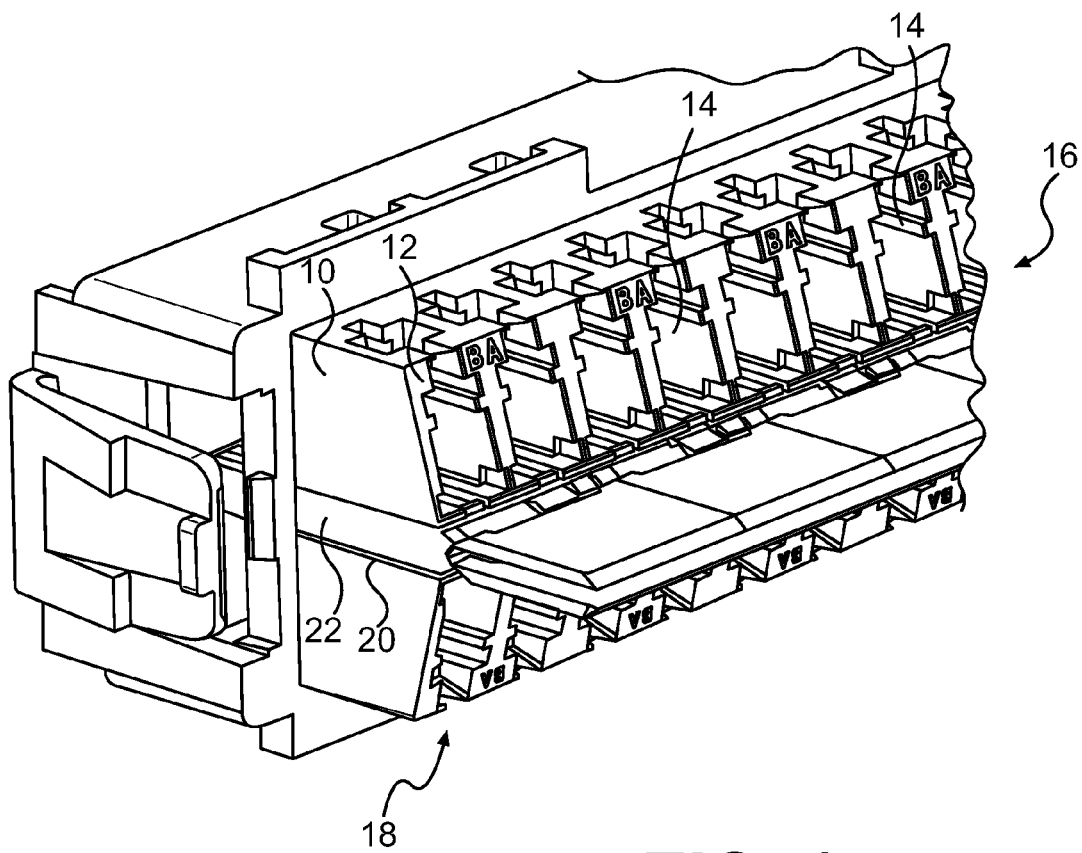
FIG. 1 is a perspective view of a fiber-optic module provided with a plurality of shutter components according to an embodiment of the present invention, the shutter components having shutters in open positions.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a fiber optic adapter 10 which includes a front wall 12 having a plurality of receptacles 14 configured to receive conventional male fiber optic connectors (not illustrated). The receptacles 14 are arranged in a first row 16 and second row 18 spaced from the first row by an opening 20, and each receptacle 14 is connected to an optical fiber (not shown) located inside the fiber optic adapter 10. Plugging a male connector into one of the receptacles 14 establishes an optical communication pathway between an optical fiber inside the fiber optic adapter 10 and a fiber optic cable connected to the male fiber optic adapter in a conventional manner. The fiber optic adapter 10 may be used in a variety of conventional environments—in various rack systems, for example, or as part of a fan-out adapter in which multiple optic fibers from a trunk cable are separated and fanned out to a plurality of receptacles such as receptacles 14.

Figure 2:
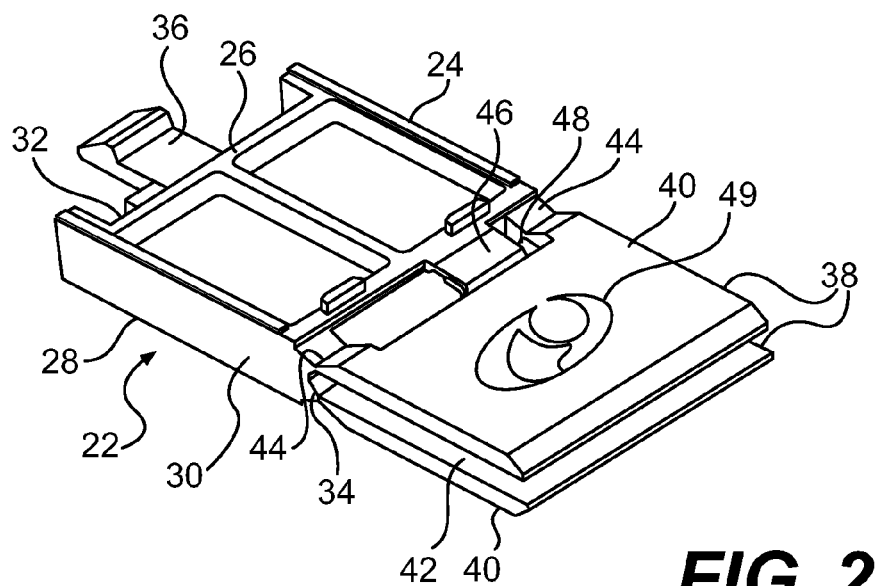
FIG. 2 is a perspective view of one of the shutter components of FIG. 1.
Figure 3:
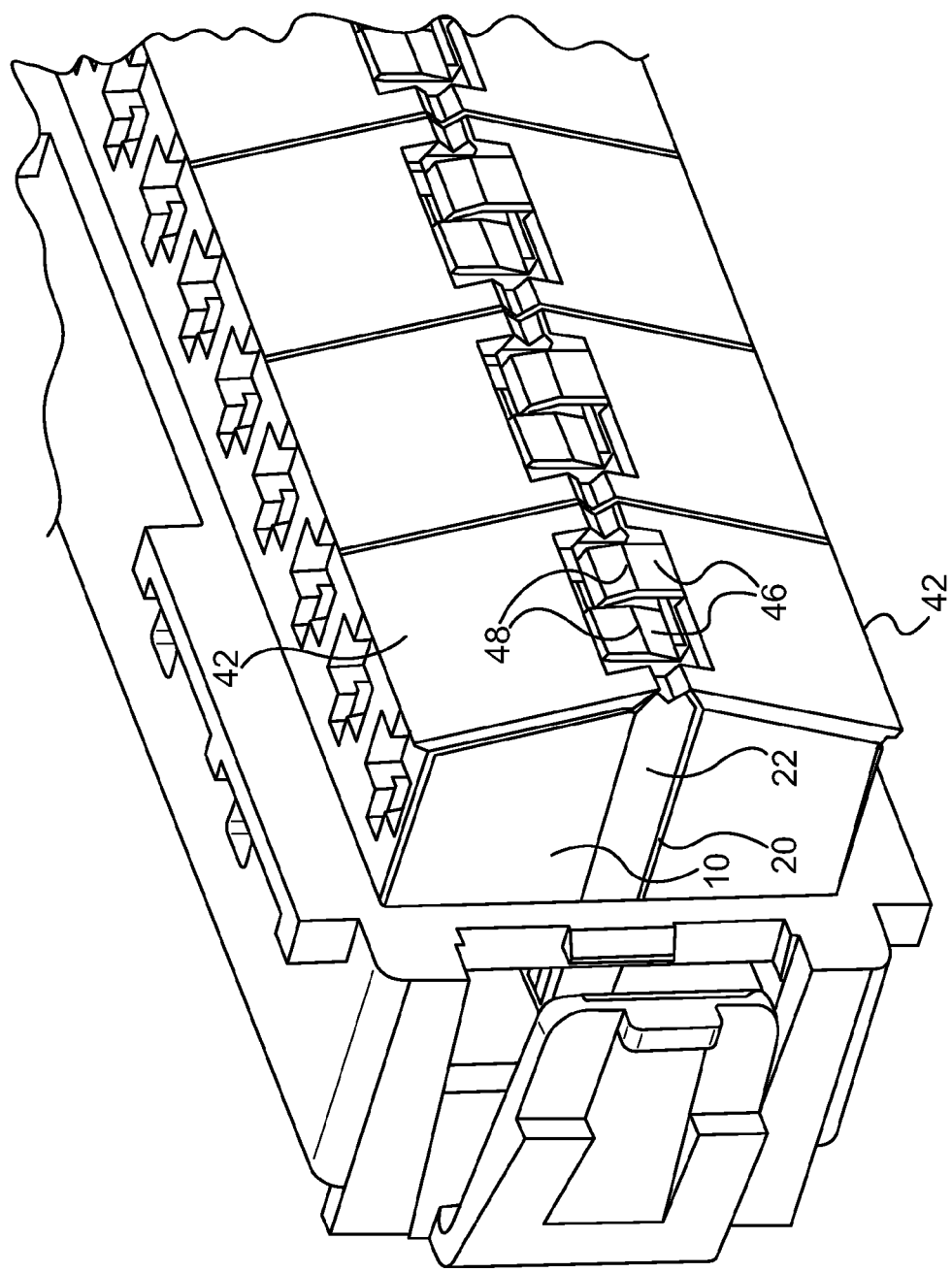
FIG. 3 is a perspective view of the fiber optic adapter of FIG. 1 showing the shutters of all shutter components in the closed position.

Also illustrated in FIG. 1 are a plurality of shutter components 22 mounted between the first row 16 and second row 18 of receptacles 14 in openings 20. One of these shutter components 22 is illustrated in FIG. 2 separate from the fiber optic adapter 10. Each shutter component 22 includes a shutter base 24 having a top 26, a bottom 28 substantially parallel to the top 26, first and second parallel side walls 30, a rear wall 32 and a front wall 34, the rear wall 32 including a tab 36. The first and second shutters 38, which may be referred to as "upper" and "lower" shutters based on the orientation of shutter components 22 in FIG. 2, each have a first or contacting face 40 and a second or exposed face 42 and extend from front wall 34. The first and second shutters 38 are connected to front wall 34 by first and second integral, flexible, living hinge members 44 and a central spring hinge member 46 having an elbow portion 48 which central spring hinge member 46 comprises an over-center hinge. The central spring hinge member 46 visible in FIG. 2 is connected to the lower one of the shutters 38; the upper shutter 38 also includes a central spring hinge member 46 which is illustrated in FIG. 3 but not visible in FIG. 2. Shutter component 22 is preferably molded as a single unitary component from polypropylene or polyethylene, and the unitary nature of the shutter component simplifies manufacturing and reduces or avoids assembly steps which were required with some previous covers.

Shutter base 24 is configured to fit snugly within opening 20 in fiber optic adapter 10, and tab 36 engages a slot (not illustrated) at an inner portion of opening 20 to secure shutter component 22 in opening 20. Other arrangements for mechanically or adhesively connecting shutter base 24 to fiber optic adapter 10 could also be used. The dimensions of the shutter base 24 and the opening 20 are selected such that, when shutter base 24 is fully inserted in opening 20, the front wall 34 of the shutter base 24 is generally aligned with the front wall 12 of the fiber optic adapter 10 leaving flexible hinge members 44 and shutters 38 extending outwardly from the fiber optic adapter 10. The first and second shutters 38 are shiftable between first and second positions—a first position illustrated in FIG. 3 wherein the contacting faces 40 of the shutters 38 contact front wall 12 of fiber optic adapter 10 leaving exposed faces 42 visible to a user and a second position illustrated in FIG. 1 wherein exposed faces 42 are generally parallel and facing one another.

As illustrated in these figures, each shutter 38 has a width sufficient to cover a pair of side-by-side receptacles 14 in a row, and each shutter component 22 includes two shutters 38 so that a total of four receptacles 14 can be covered or uncovered two at a time by a single shutter component 22. Shutters 38 could be resized if desired to cover only one receptacle or more than two receptacles, and shutter component 22 could be configured to include only one shutter 38 for covering one or more receptacles in a single row of receptacles. Furthermore, shutters of different sizes could be provided on the same shutter component if desired for a particular application.

Central spring hinge member 46 is formed to bias shutter 38 against front wall 12 in the first position with sufficient force to maintain the shutter 38 in a closed position to help keep dust out of unused receptacles. Central spring hinge member 46 is also configured to bias shutter 38 toward the second position so that, as illustrated in FIG. 1, the lowermost of the two shutters 38 will remain in the second position against the force of gravity and thus maintain its position away from front wall 12 to facilitate the installation of a fiber optic connector. This bistable configuration allows a worker to place the shutter 38 in a desired position without the need to latch the shutter closed (as may be necessary for shutters that include a latch) and without the need to hold the shutter open against a return spring biasing force for shutters with separate springs that are always biased toward the closed position. As used herein, "bistable" means that the shutter remains stably in one of two positions and is biased toward one of the two positions when the shutter is between the two positions.

The elbow portion 48 is formed to have a relaxed, unstressed angle that is less than the angle required to hold the shutter 38 in either the first or second position. Thus, with reference to FIG. 3, for example, the elbow portion 48 of the spring hinge member 46 may be formed to have a natural or relaxed angle of 135 degrees; however, the elbow portion 48 cannot contract beyond the approximately 160 degree angle illustrated in the Figures. The elbow portion 48 thus remains in a stressed configuration and biases shutter 38 against front wall 12, as the elbow portion 48 attempts to contract toward its relaxed angle, with a force sufficient to hold the shutter 38 securely in the closed position with contacting face 40 engaging front wall 12 of the fiber optic adapter 10. When shutter 38 is moved toward the second position, by a user opening the shutter, spring hinge member 46 resists movement during the first portion of travel toward the second position because such movement increases the angle of elbow portion 48 and this increase in angle is resisted by the resilient nature of the material from which the shutter component is formed. However as the shutter 38 moves past approximately the half-way portion of its travel toward the second position, the geometry of the spring hinge member 46 and the shutter 38 allows the angle of the elbow portion 48 to again begin to decrease, and this contracting elbow portion 48 therefore pulls shutter 38 toward the second position. Again, the spring hinge member 46 is preferably formed so that the angle of elbow portion 48 cannot contract to a natural or rest angle and therefore the spring hinge member 46 biases the shutter 38 toward the second position as well. This arrangement forms a bistable shutter with a snap-action that moves between the first and second positions. Flexible hinge members 44 provide stability and help the shutter move between the first and second positions without twisting, but do no contribute to the bistable nature of the shutter.

If the internal optical fiber leading to one of the receptacles 14 is active, light will be emitted from that particular one of the receptacles 14. Polypropylene and polyethylene in their natural states are translucent, and thus even when shutters 38 are closed, it will be possible to see an illumination through the shutter material caused by the laser light as it is defused/attenuated by the shutter material and know which of the empty receptacles 14 contains an active optical fiber. Of course, the shutter of an empty receptacle having an active optical fiber should not be opened, as direct laser light can be harmful to human vision.

It is also possible to provide letters or other indicia 49 on the contacting face 40 of the shutters 38 which will be visible through the translucent material of the shutters, especially when a particular receptacle is connected to an active optical fiber. The molding process used to mold the unitary shutter forms the shutter substantially in the position and configuration shown in FIG. 2. The exposed faces 42 of shutters 38 must be substantially flat and smooth to allow them to slide off the portion of the mold that is held between the shutters 38 during the molding process, and thus molded indicia cannot be provided on these surfaces. However, because the material of the shutters 38 is translucent, a mirror image of the desired indicia 49 can be provided on the contacting face 40 and the proper, reversed view of the mirror image indicia will be visible from the exposed side 42 of the shutter 38.

Figure 4:
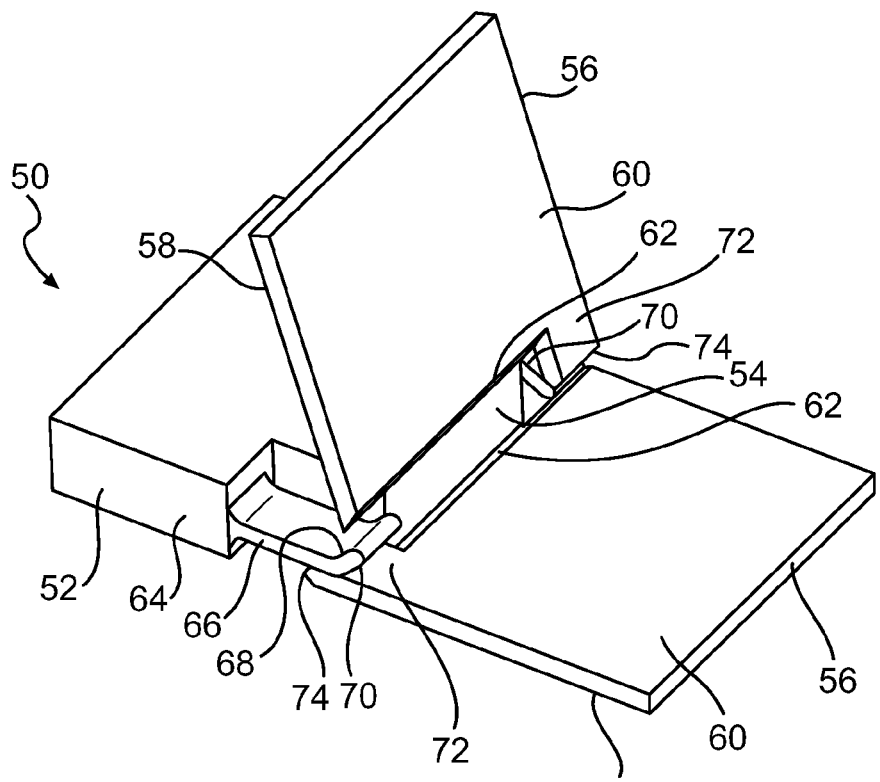
FIG. 4 is a perspective view of a shutter component according to a second embodiment of the present invention.

A second embodiment of a shutter component 50 is illustrated in FIG. 4. Shutter component 50 includes a shutter base 52 that is configured to be received in an opening on a fiber optic adapter such as opening 20 in fiber optic adapter 10 of FIG. 1. Shutter base 52 has a front side 54 to which first and second shutters 56 having contacting faces 58 and exposed faces 60 are attached by a flexible hinge 62, and first and second side portions 64 on either side of front side 54. Each of the side portions 64 includes a reduced thickness portion 66 having a flexible, angled end portion 68 with a sliding surface 70. Each shutter 56 includes a tab 72 projecting from the shutter on one side of the flexible hinge 62 and having a sliding end 74 engaging the sliding surface 70 of one of the angled end portions 68.

The upper shutter 56 illustrated in FIG. 4 is biased toward a closed position in which contacting face 58 would be biased against the front wall 12 of fiber optic adapter 10 over one or more receptacles. In this configuration, flexible angled end 68 presses against the tab 72 of the upper shutter 56 to hold it in this first or closed position. The relationship between the shutter 56 and the front wall 12 of the fiber optic adapter is selected such that the flexible angled end 68 biases the shutter contacting face 58 against a fiber optic adapter and holds it securely closed. If the upper shutter 56 in FIG. 4 is pulled toward a second or open position, the position of the lower shutter 56 in FIG. 4, tab 72 presses against angled end portion 68 and flexes angled end portion 68 enough to allow the continued movement of tab 72. As tab 72 passes a central portion of angled end portion 68, when shutter 56 is approximately half way between the opened and closed positions, flexible end portion 68 begins to return toward its starting position and press tab 72 toward the ending position of bottom shutter 56 in FIG. 4 with shutter 56 fully open. The relationship between the tabs 72 and angled end portions 68 is selected to bias the shutters toward first and second, or open and closed, positions, and provide a bistable shutter for a fiber optic receptacle.

Figure 5:
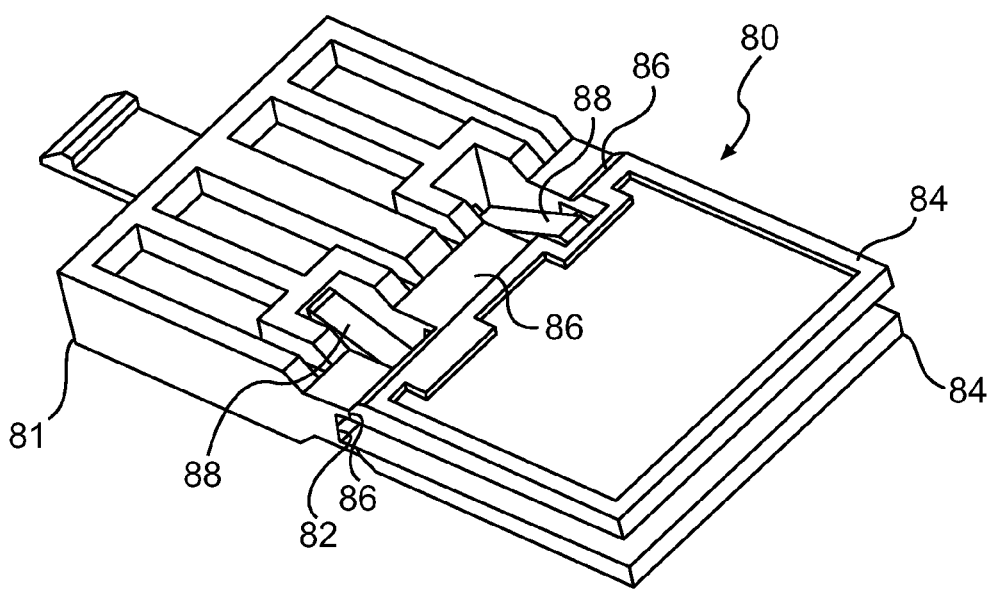
FIG. 5 is a perspective view of a shutter component according to a third embodiment of the present invention.

FIG. 5 illustrates a third embodiment of a shutter component, shutter component 80. Shutter component 80 includes a shutter base 81 having a front wall 82 to which first and second shutters 84 are attached by first, second and third flexible hinge members 86 and one spring arm 88 connected between each shutter 84 and a pair of the first, second and third flexible hinge members 86. The length of spring arm 88 is selected such that it is slightly curved away from a relaxed, linear configuration when the shutter 82 is in a closed configuration (not illustrated but similar to the closed configuration of the upper shutter 56 of FIG. 4) and the open position illustrated in FIG. 5. To shift a shutter 84 between the first and second positions, the shutter 84 is moved by an operator toward the second position which movement increases the curvature of the spring arm 88 for the first portion of the shutter's travel. When the shutter 84 moves approximately half way toward the second position, the spring arm 88 begins to unbend, and the force of this unbending biases the shutter 82 toward the second position and holds the shutter in this second position in a bistable manner.

The present invention has been described herein in terms of several embodiments. However, modifications and additions to these embodiments will become apparent to those of ordinary skill in the art upon a review of the foregoing description. It is intended that all such additions and modifications comprise part of the present invention to the extent they fall within the scope of the several claims appended hereto.

We claim:

1. A fiber optic component comprising:
   a body including at least one receptacle configured to receive a fiber optic connector;
   a shutter base mounted to said body at a mounting location adjacent to said at least one receptacle; and
   a first shutter connected to said shutter base by a first hinge, said first shutter, first hinge and shutter base comprising a unitary molded member,
   wherein said first shutter is shiftable from a first position biased against said body and covering said at least one receptacle to a second position angularly spaced from said first position and projecting away from said body outside said receptacle, and
   wherein said unitary member comprises a first member which biases said first shutter toward said first position when said first shutter is near said first position and which also biases said first shutter toward said second position when said first shutter is near said second position.

2. The fiber optic component of claim 1 wherein said first hinge comprises an over-center hinge.

3. The fiber optic component of claim 1 wherein said first hinge comprises first and second flexible bands between said first shutter and said base and said first member includes a third flexible band between said first and second flexible bands having a flexible elbow portion for biasing said first shutter toward said first position or toward said second position.

4. The fiber optic component of claim 1 wherein said at least one receptacle includes two receptacles in a row and wherein said first shutter is configured to cover said first and second receptacles in said first position.

5. The fiber optic component of claim 1 wherein said at least one receptacle comprises a first receptacle on a first side of the mounting location and a second receptacle on a second side of the mounting location and wherein said component further includes a second shutter connected to said shutter base by a second hinge, said second shutter being shiftable between a first position biased against said component and covering said second receptacle and a second position angularly spaced from said first position.

6. The fiber optic component of claim 5 wherein said second shutter comprises a second member which biases said second shutter toward said first position when said second shutter is near said first position and which also biases said second shutter toward said second position when said second shutter is near said second position.

7. The fiber optic component of claim 6 wherein said second shutter and said second hinge are part of said unitary member.

8. The fiber optic component of claim 5 wherein said first shutter in said second position extends generally parallel to said second shutter in said second position.

9. The fiber optic component of claim 5 wherein said body includes an opening and wherein said shutter base is mounted in said opening.

10. The fiber optic component of claim 1 wherein said unitary member comprises a translucent or transparent material.

11. The fiber optic component of claim 10 wherein said first shutter includes a first side facing said at least one receptacle when said first shutter is in said first position and a second side opposite said first side, wherein said first side includes molded indicia visible through said second side.

* * * * *